United States Patent [19]

Sterling et al.

[11] Patent Number: 5,143,963
[45] Date of Patent: Sep. 1, 1992

[54] THERMOPLASTIC POLYMERS WITH DISPERSED FLUOROCARBON ADDITIVES

[75] Inventors: Robert E. Sterling, Homosassa Sps; Eugene P. Goldberg, Gainesville, both of Fla.

[73] Assignee: RES Development Corp., Lecanto, Fla.

[21] Appl. No.: 639,232

[22] Filed: Jan. 9, 1991

Related U.S. Application Data

[63] Continuation of Ser. No. 446,675, Dec. 6, 1989, abandoned.

[51] Int. Cl.[5] .................................................. C08K 5/06
[52] U.S. Cl. .................................... 524/366; 524/462
[58] Field of Search ............................... 524/366, 462

[56] References Cited

FOREIGN PATENT DOCUMENTS 0222201 5/1987 European Pat. Off. ............ 524/366
60-104161 6/1985 Japan ................................. 524/366

*Primary Examiner*—Melvyn I. Marquis
*Assistant Examiner*—Mark Sweet
*Attorney, Agent, or Firm*—Kerkam, Stowell, Kondracki & Clarke

[57] ABSTRACT

A composition of matter formed by melt-blending a thermoplastic polymer and from 0.01% to <1% of a fluorocarbon additive, the additive having a lower surface energy than that of the polymer; the blending resulting in a cooled admixture having a concentration of fluorocarbon additive through a cross-section of the solid composition lower in the interior thereof and higher at the surfaces thereof.

14 Claims, No Drawings

THERMOPLASTIC POLYMERS WITH DISPERSED FLUOROCARBON ADDITIVES

This is a continuation of application Ser. No. 07/446,675 filed Dec. 6, 1989, now abandoned.

BACKGROUND OF THE INVENTION

1. Field of the Invention

The present invention relates to thermoplastic polymers modified with certain fluorocarbon additives.

2. Description of the Prior Art

It has recently been proposed to modify thermoplastic polymers by incorporating therein various oils, gums, etc.

U.S. Pat. No. 3,485,787 discloses that certain block copolymers may be extended by incorporating mineral oil therein. U.S. Pat. No. 3,830,767 teaches that bleeding of the extending oil from the block copolymer may be prevented by incorporating a petroleum hydrocarbon wax therein.

U.S. Pat. No. 4,123,409 relates to block copolymers having thermoplastic terminal blocks and an elastomeric intermediate block. The patent discloses blending with the copolymer a high molecular weight oil which is compatible with the elastomeric block portion of the copolymer. Where the elastomeric portion is a hydrocarbon, the oil employed is a mineral oil. Where the elastomeric block is a polysiloxane, a silicone oil is blended therewith.

U.S. Pat. No. 3,034,509 discloses the addition of silicone oil to polyethylene for use as surgical tubing.

U.S. Pat. No. 4,386,179 discloses the dispersion of a polysiloxane throughout an elastomeric thermoplastic hydrocarbon block copolymer.

Japanese Patent No. 60104161 describes an anti-friction composite material comprising a resin and more than 1%, by weight, of a fluorocarbon oil which have been injected molded together in a manner such that the oil exudes onto the molded surfaces of the resin due to poor compatibility of the oil with the resin and differences in viscosity between the resin and oil to produce an anti-friction surface.

There is continuing research leading to the development of novel polymeric materials whose properties are tailored by incorporating therein various additives.

It is an object of the present invention to provide novel thermoplastic polymer compositions having unique properties and which find utility in a wide variety of applications.

It is a further object of the invention to provide a novel method for preparing thermoplastic polymer compositions having properties and characteristics heretofore unattainable.

SUMMARY OF THE INVENTION

These and other objects are realized by the present invention which provides a composition of matter formed by melt-blending a thermoplastic polymer and from about 0.01% to less than 1%, by weight, of a fluorocarbon additive selected from the group consisting of a fluorocarbon oil, a fluorocarbon gum, a fluorocarbon grease and mixtures thereof, the fluorocarbon additive having a lower surface energy than that of the polymer; the melt-blending resulting in a substantially homogenous admixture of the polymer and the fluorocarbon additive; the admixture, upon cooling, resulting in a solid composition wherein the concentration of fluorocarbon additive is lower in the bulk polymer and higher at the surfaces thereof, i.e., is a gradient through a cross-section of the solid composition from a lower value in the interior or bulk thereof to a higher value at the surfaces thereof.

A further embodiment of the invention comprises a method of forming a composition of matter comprising a thermoplastic polymer and from about 0.01% to less than about 1%, by weight, of a fluorocarbon additive selected from the group consisting of a fluorocarbon oil, a fluorocarbon gum and mixtures thereof, the fluorocarbon additive having a lower surface energy than that of the polymer, the method comprising melt-blending, preferably in an efficient compounding blender, the polymer and the fluorocarbon additive at a temperature above the glass transition temperature or softening point of the polymer but below that having a deleterious effect on the polymer and the fluorocarbon additive and for a time sufficient to produce a substantially homogenous admixture of polymer and fluorocarbon additive, followed by cooling the admixture to produce a solid composition wherein the concentration of fluorocarbon additive through a cross-section of solid composition is lower in the polymer bulk thereof and higher at the surfaces thereof, i.e., is a gradient through a cross-section of the solid composition from a lower value in the interior or bulk thereof to a higher value at the surfaces thereof.

DETAILED DESCRIPTION OF THE INVENTION

Although most non-fluorinated polymers are not compatible with fluorocarbon oils and gums and are also not readily blended therewith because of the high specific gravity of the fluorocarbons, the present invention is predicated on the discovery that thermoplastic polymers when efficiently melt-blended with less than 1%, by weight, of a fluorocarbon oil, gum or mixture thereof such that the fluorocarbon additive is homogenously distributed throughout the melt, yield, upon cooling, solid compositions which, because of the differences in thermodynamic compatibility and surface energy between the fluorocarbon additive and the polymer, have higher concentrations of the additive at the surface than throughout the interior thereof.

In the phrase, "concentration of fluorocarbon additive is a gradient through a cross-section from a lower value at the center thereof to a higher value at the surfaces" the term "gradient" is not intended to suggest that the concentration varies uniformly from the center of the composition to the surface. Although this may be the case with respect to some combinations of polymer and additive, typically, a much higher concentration of the additive is at the surfaces of the composition with a much smaller amount in the interior or bulk of the polymer.

This higher concentration of fluorocarbon additive at the surface of the polymer enables the provision of a polymer composition having heretofore unattainable properties. Thus, using very low concentrations of fluorocarbon additive below 1%, relatively high concentrations are attainable at the surface.

The high concentrations of fluorocarbon additive at the surfaces provide compositions having the advantages of fluorocarbon-like surface properties, i.e., greater hydrophobicity, lower surface energy, non-adherent surface characteristics, more chemically inert, lower friction, smoother, etc. In addition, the presence of the fluorocarbon additive enhances molding operations since it reduces "sticking" of the composition to the mold surfaces and enhances mold release. Also, the additive will, because of the lubricant properties thereof, permit higher speed processing of extruded objects, i.e., films, fibers and other objects formed therefrom and with smoother surfaces; with the added benefits of shorter injection molding cycles and higher extrusion rates.

For biological or biomedical applications of the polymer compositions, the fluorocarbon surfaces are especially advantageous since they exhibit superior biocompatibility in contact with tissue surfaces, cells, physiological fluids and blood as compared with most thermoplastic polymers.

The compositions of this invention are therefore particularly advantageous for such applications as blood and fluid handling, medical tubing; vascular grafts, mammary implants, joint and tendon prostheses, ocular implants, and the like.

Fibers prepared from compositions of the invention possess superior surface smoothness and uniformity and handling properties for weaving as well as different textures and "feel" because of the surface properties imparted by the fluorocarbon additives. In addition, the compositions and methods of the invention are advantageous and more economical in the manufacture of fibers since the high concentration of fluorocarbon additive at the surfaces of the fiber facilitates high-speed processing with less damage to dies, shuttles and weaving equipment to produce more uniform, smooth melt spun fibers.

For the most part, the basic bulk mechanical, physical and chemical properties of the thermoplastic polymer employed are retained or even enhanced for the compositions of the present invention but acquire the fluorocarbon surface properties of the additive due to the above-noted gradient concentration of the fluorocarbon additive through a cross-section of the composition from a lower value in the bulk to a higher value at the surface. This makes the compositions of this invention also advantageous for molds such as those used for optical and electronic parts, i.e., contact lenses, and for electro-optical or electromechanical devices which require low surface energy and low friction surfaces, i.e., video tapes, compact discs for audio or video recording, electromechanical switches, and the like.

The lower concentrations of fluorocarbon additive in the interior portion of the thermoplastic can also advantageously modify the bulk mechanical, physical and chemical properties of the polymer, however, particularly with respect to the classes of thermoplastic polymers discussed hereinbelow.

A unique advantage associated with the compositions of the invention is that if cut into plural sections, the fluorocarbon additive in the interior will migrate to the new surfaces formed by the cutting operation.

A wide variety of polymers may be utilized in the practice of the invention. Preferred among the suitable polymers are:

I. Polyolefins such as polyethylene, polypropylene, etc., are advantageously and preferably employed in the practice of the invention because fluorocarbon surface properties are achieved at very low overall fluorocarbon additive concentrations. For example, using only 0.5 wt% of a 450 centistoke viscosity perfluoropolypropylene oxide fluorocarbon oil in low density polyethylene, a surface composition of 21 atomic % fluorine is achieved as shown by XPS analysis. This surface is characterized by an increase in hydrophobicity (water contact angle changed from 61° for polyethylene to 94° for the fluorocarbon modified composition) and a decrease in surface energy (from 40.6 dynes/cm for polyethylene to 28.1 dynes/cm for the fluorocarbon modified polyethylene); indicative of the significantly altered surface properties achieved using only 0.5 wt% of fluorocarbon additive. An improvement in mechanical properties, greater ductility, is also achieved using the fluorocarbon additive. Tensile elongation changes from 840% for polyethylene to 1100% with 0.1% F-additive and 1500% with 0.3% F-additive. The energy required for extrusion (torque) is also substantially reduced.

II. Olefin copolymers and block copolymers such as ethylene-propylene, and styrene-olefin block copolymers such as styrene-butadiene, styrene-butadiene-styrene, and styrene-ethylene/butylene-styrene and styrene graft copolymers such as styrene-butadiene-acrylonitrile (ABS) are another class of preferred polymers for the practice of the invention. For example, the modification of a styrene-ethylene/butylene-styrene block copolymer results in greatly improved mechanical properties; from 825 psi tensile strength for S-E/B-S to 1600 psi with only 0.1 wt% additive. ABS graft polymers (i.e., Cycolac TM) are readily modified to improve surface properties; 0.3 wt% F-additive yielding 5 atomic % surface fluorine and an increase in hydrophobicity to 96° contact angle from 73° with 0.8 wt% F-additive.

III. Polyether and polyamide polymers and block copolymers such as a polyether-polyamide are a third class of preferred polymers for use in the practice of the invention. Mechanical, surface, and processing properties here too are improved by low concentrations of F-additive. For example, improved tensile strength and ductility as shown by an increase in tensile strength from 4030 psi to 4850 psi and an increase in % elongation from 1110% to 1490% with 0.1 wt% F-additive.

IV. Polyesters such as polyethylene terephthalate (PET), polybutylene terephthalate (PBT), aromatic terephthalates and isophthates, and polycarbonates and polyurethanes such as those with aromatic or aliphatic isocyanate derived polymers with polyether or polyester soft segments are also significantly improved by low concentrations of F-additive. For example, PBT exhibits improved extrusion and molding properties as well as fluorocarbon surface properties; i.e., 5.3 atomic % surface fluorine with 0.5% additive. Bisphenol polycarbonate, with 0.5 wt% F-additive, has improved tensile strength (7410 to 7930 psi), increased hydrophobicity (contact angle from 78 to 97°), and exhibits 32 atomic % surface fluorine.

V. Other vinyl polymer also exhibit enhanced properties and fluorocarbon surfaces using the additives of this invention. Such polymers include acrylic and methacrylic polymers, i.e., polymethylmethacrylate, polymethylacrylate, polybutylmethacrylate, etc., and polyvinyl chloride, and various aromatic vinyl polymers, i.e., polystyrene.

With 0.3 wt%, F-additive, polystyrene molding and extrusion is enhanced and surface fluorine of 10 atomic % is achieved.

It is preferred to employ fluorocarbon additives having a surface energy substantially lower than that of the polymer with which it is compounded in order to ensure the high surface fluorine concentration described above.

Suitable fluorocarbon oils, gums and greases include fluorinated hydrocarbons and fluorinated hydrocarbon-polyether oils, i.e., Aflunox ™ and Krytox ™ oils and greases, including such oils, gums and greases as perfluoropolyethyleneoxide, perfluoropolypropylene oxide, polytetrafluoroethylene oligomers, perfluoropolyethylene-propylene, perfluoropolybutadiene oligomers, polyvinylidene fluoride oligomers and their copolymers and perfluorohydrocarbon oils such as perfluorocyclohexane, perfluorohexane, perfluorododecane and higher molecular weight homologous linear or branched perfluorohydrocarbons, and perfluorinated cyclic hydrocarbons.

The preferred fluorocarbon oils, gums and greases of this invention are characterized by having viscosities in the range of 20 to more than 50,000 centistokes at 20° C., and the preferred fluorocarbon greases useful in this invention are characterized by having consistencies (as determined by ASTM D-217) in the range of NLGI grades 0 to 6. Preferred greases include those made by mixing or blending fluorolyether oils with perfluorhydrocarbons, such as those prepared from mixtures of Krytox ™ fluoroether oils with Vydax ™ fluorotelomers.

The selection of a particular oil, gum or grease will depend, of course, on the intended applications of the resultant composition.

Generally, it is preferred that the fluorocarbon additive have a lower surface energy, by more than about 5 dynes/cm, as compared with the polymer with which it is compounded.

It is a particularly advantageous feature of the present invention that extremely small amounts of fluorocarbon additive may be incorporated in the thermoplastic polymer to achieve the highly unusual and desirable properties associated with the compositions of the invention.

The method of the invention for compounding the polymer and fluorocarbon additive enables the use of such small amounts. By ensuring that the melt-blending step results in a homogenous admixture of the ingredients, one is able to obtain, upon cooling the melt, a solid composition having the above-described gradient concentration. If the ingredients are not homogeneously melt-blended, the product will comprise a composition wherein a substantial amount of unmixed free fluorocarbon additive simply coats the surface of the polymer. Because of the incompatibility of the F-additive and the difference in surface energies between the polymers and the fluorocarbon additive, the latter will not readily diffuse into and penetrate the polymer to any appreciable extent. Relatively uniform dispersion of the additive throughout the polymer during preparation requires homogenous blending in the melted state. This is not achievable by the mixing normally obtainable by injection molding or single screw extrusion. Attempts to mold or extrude thermoplastics blended with as little as 0.5 wt% or 0.25 wt% fluorocarbon oil additive in modern screw/ram injection molding machines or single screw extruders results in substantial melt inhomogeneity and screw slippage in the melt with consequent erratic flow making it impractical to form the polymer by simple molding or extrusion without first using the efficient high shear compounding blending method of the invention.

A melt-blending apparatus which ensures homogenous mixing of the ingredients is required. It has been found that a twin-screw compounding blender/extruder is particularly advantageous and is therefore preferred for carrying out the method of the invention.

Any suitable temperature which is below the decomposition temperature of either the polymer or additive but above the softening point of the polymer and which ensures homogenous admixing of the ingredients may be employed.

To facilitate admixing of the fluorocarbon additive with the polymer, it is preferred to employ small particle sizes (e.g., pellets or powders) of the polymer. This ensures efficient wetting of the polymer particle surface prior to melt-blending thereby ensuring efficient dispersion of the additive throughout the polymer.

In the most preferred embodiment, the fluorocarbon additive is pre-mixed with a fraction of pelletized polymer and the thus wetted fraction or pre-mix is then admixed with the remainder of the polymer and subsequently melt-blended in an efficient high shear compounding extruder such as a twin screw compounding extruder-blender.

A major improvement in melt processing for homogeneously blended compositions of this invention is achieved by the incorporation of $< 1$ wt% of the fluorocarbon additive. In addition to smoother surface finish and more uniform melt flow which is critically important for forming precision parts, fibers and films, less torque or pressure is required for many compositions as compared to the normal thermoplastic polymer. For example, a reduction in extrusion torque from 3700 meter-grams to 1950 meter-grams is achieved for low density polyethylene containing only 0.5 wt% fluorocarbon oil.

The invention is illustrated by the following non-limiting examples in which all percentages are by weight except as otherwise indicated.

EXAMPLE 1

This example illustrates the need for highly efficient compounding blending for homogeneous mixing to achieve the compositions of this invention and the inability to obtain such good mixing of the fluorocarbon additives of this invention in conventional screw-ram injection molding or normal screw extruders which are not designed for high shear compounding.

Pellets of an S-E/B-S thermoplastic (styrene-olefin block copolymer, Shell Kraton G) were added to the hopper of a screw-type injection molding machine of the latest design and equipped with open loop electronic controllers for controlling injection speeds, pressures, speed changeover positions, screw rotation speeds, metering, decompression, etc. A mold for a 4.00×4.00×0.25 inch part was used and conditions were set and tested to insure good molding of the part with the base polymer. The base polymer was then purged from the hopper and hopper screw. Base polymer was tumble mixed with 0.5 wt% fluorocarbon oil (perfluoropolypropylene oxide, viscosity 450 centistokes at 20° C.) to insure uniform coating of the pellets which were then carefully introduced into the injection molding machine screw for molding under conditions used for the base polymer. It was found, however, that the polymer containing 0.5 wt% additive would not feed adequately for molding. Satisfactory molding could not be achieved despite testing a number of variations in screw speeds and other molding conditions. A similar result, inability to properly feed and mold the base polymer with additive was observed using only 0.25 wt% additive. A major problem was the slippage of material around the screw flights which resulted in a pressure through the screw which was inadequate to move the melt through the nozzle for satisfactory injection molding. From this experiment, it is clear that homogeneous blending is essential for preparing compounds which can be injection molded or extruded to yield uniform parts. High shear compounding-blending, such as that achieved in a twin-screw compounding extruder of screw-flight design for efficient high shear melt mixing, achieves such good blending for the preparation of the compositions of this invention.

EXAMPLE 2

The following procedure was employed to prepare the compositions identified herein.

A number of compositions were prepared with dispersed perfluorocarbon oil (perfluoropolypropylene oxide, 450 centistoke viscosity at 20° C., Dupont Krytox ™ AX) in the following manner: The appropriate weight of the oil was added to about 100 grams of polymer pellets as a premix. This was then added to 1-2 pound quantities of the polymer which was tumble mixed to uniformly distribute the premix pellets which had been wet with the fluorocarbon oil. In initial experiments, concentrations in the range 0.1 to 0.6% oil were used and the polymer-pellet premix appeared uniform. The oil-mixed pellets were fed into an HBI System 90 microprocessor controlled torque rheometer twin screw extruder (conical twin-screw, three-quarter-inch compounding blender/extruder, with a two-inch, heated strip-die head) to produce approximately 2-inch-wide film extrusions of approximately 0.06-inch thickness. Post-extrusion equipment involved chilling rolls in a 3-roll, take-up system. The extruder-rheometer provided information during the compounding and extrusion for torque, temperature, head pressure, etc.

The extrusion blending was generally run at speeds of 20-50 RPM.

The following polymers wre blended with oil.

A. Low-Density Polyethylene (PE). Blends were prepared using 0.1, 0.2, 0.3 and 0.5% oil. The virgin resin was run first as a control before running the blended compositions. The polyethylene blends extruded well, exhibiting good oil compatibility with no evidence of oil bleeding, even at 0.5%. Extrusion temperatures were 440 to 460.F at 25 RPM. In addition to the increased smoothness of the surface with increasing fluorocarbon oil concentration, there was progressive reduction in torque from about 3700 meter grams (M-g) for the unmodified polyethylene to about 1950 M-g for the 0.5% blend. There was also a reduction in the head pressure from about 720 psi to about 525 psi. These are significant improvements in extrusion processing conditions. The dispersion homogeneity of the fluorocarbon oil at concentrations as high as even 0.5 wt% was excellent using this method of twin screw extrusion melt blending.

B. Polypropylene (PP) was compounded with 0.1, 0.2 and 0.5 wt% oil. It, too, exhibited excellent blend homogeneity at all concentrations. Extrusion zone conditions were 370 to 440° F at 25 RPM. For polypropylene, there was a surprisingly rapid reduction in torque from 4735 M-g for polypropylene to 1395 M-g with only 0.1% fluorocarbon oil.

C. Styrene-Ethylene/Butylene-Styrene TPE Block Copolymer (SEBS) was compounded with 0.1, 0.3, and 0.6% fluorocarbon oil and exhibited excellent blend homogeneity at all concentrations. Extrusion was at zone temperatures of 300°-360° F. at 45 RPM.

D. 50:50 Blend of SEBS Block Copolymers (Shell Kraton ™ G2705 and G2706). This mixture was blended with 0.1 and 0.6% oil at 25 RPM. The oil additive even at the high concentration, exhibited good blend homogeneity and smoothing of the surface with increasing additive concentration.

E. Polyamide-Polyethylene Oxide Block Copolymer was compounded with 0.1, 0.3, and 0.6% fluorocarbon oil at 35 RPM with zone temperatures set at 300°-380° F. The torque for the unmodified material was approximately 2470 M-g and increased slightly to 3170 meter grams at 0.1% additive and then dropped to 2200-2400 M-g at the higher concentrations of 0.3 and 0.6%. A pronounced smoothing of the extruded film surface was observed due to the additive.

F. In another series of experiments on the same twin-screw rheometer twin screw extruder, a polyester (PBT), a polyurethane, an ABS resin, a polystyrene, and a polycarbonate were each blended with various concentrations of the fluorocarbon oil. In all cases, in these experiments, surprisingly good blend homogeneity of the fluorocarbon oil was observed with visible improvements in extrusion and surface finish of the resulting films.

Samples were tested for tensile strength and % elongation on an Instron, Model 1122 tester using a 2-inch ASTM, die-cut dogbone sample. Approximately five tests were run per sample at a strain rate of 2 inches per minute. For some samples, contact angle wettability using water and methylene iodide was measured to determine the changes in surface hydrophobicity and surface energy produced by the additive. This was done with a Rami-Harte goniometer using the method of Owens and Wendt.

Surfaces were analyzed for fluorine concentration using XPS (X-Ray Photoelectron Spectroscopy) on a Kratos spectrometer. Spectra were obtained using $MgK_\alpha$ radiation at a pressure of $10^{-8}$ torr. with typical operating perimeters of 12 KV and 20 mA. This technique samples the upper 50 angstroms of the surface for chemical composition.

The following analytical results were obtained.

POLYETHYLENE

| A. Tensile Strength (2 in. per minute/sample, thickness about 0.060 in.) | | |
|---|---|---|
| Sample # % F-additive | UTS (psi) | Elongation (%) |
| 1-Nat. | 3,930 | 840 |
| 19-0.1% | 3,870 | 1,100 |
| 2-0.2% | 4,070 | 1,350 |
| 3-0.3% | 4,170 | 1,500 |
| 4-0.5% | 3,950 | 1,480 |

The ductility of the polyethylene is enhanced significantly of low concentrations of the fluorocarbon additive.

| | B. Surface Energy | | | | |
|---|---|---|---|---|---|
| Sample # % F- additive | Contact Angle (°) (water) | Contact Angle (°) (CH$_2$Cl$_2$) | $\gamma$disp. | $\gamma$polar (dynes/cm) | $\gamma$Surf. energy |
| 1-Nat. | 61 | 66 | 16.5 | 24.1 | 40.6 |
| 19-0.1% | 72 | 62 | 20.8 | 13.6 | 34.4 |
| 2-0.2% | 96 | 53 | 32.0 | 0.8 | 32.8 |

-continued

| B. Surface Energy | | | | | |
|---|---|---|---|---|---|
| Sample # % F-additive | Contact Angle (°) (water) | (CH$_2$Cl$_2$) | $\gamma$disp. | $\gamma$polar (dynes/cm) | $\gamma$Surf. energy |
| 3-0.3% | 95 | 57 | 29.0 | 1.3 | 30.3 |
| 4-0.5% | 94 | 61 | 26.1 | 2.0 | 28.1 |

The surface energy decreases with increasing additive. The polar component decreases significantly and a smaller increase is noted in the dispersive component resulting in a significant decrease in the total surface energy, which is characteristic of a fluorocarbon surface.

| C. XPS Data | |
|---|---|
| Sample # % F-additive | F (Atom. %) |
| 2-0.2% | 3.0 |
| 3-0.3% | 12.2 |
| 4-0.5% | 21.0 |

The XPS results show much higher concentration of the fluorocarbon additive at the surface as compared to the overall amount added demonstrating the surprisingly large effect of small fluorocarbon concentrations in producing fluorocarbon surfaces. The FTIR/ATR spectra show the emergence of a new peak at 1240 cm$^{-1}$ corresponding to —CF$_2$—absorption, and its intensity increases as the amount of additive is increased. The FTIR and XPS DATA correlate well.

POLYPROPYLENE

| A. Tensile Strength | | |
|---|---|---|
| Sample # % F-additive | UTS (psi) | Elongation (%) |
| 5-Nat. | 4,310 | 730 |
| 6-0.1% | 4,280 | 770 |
| 7-0.3% | 4,200 | 700 |
| 8-0.6% | 4,320 | 700 |

The mechanical properties did not change with increasing additive concentration. The UTS was near 4,300 psi and elongation was about 750% for all samples.

STYRENE ETHYLENE/BUTYLENE STYRENE

| A. Tensile Strength | | |
|---|---|---|
| Sample # % F-additive | UTS (psi) | Elongation (%) |
| 9-Nat. | 825 | 525 |
| 10-0.1% | 1,600 | 1,490 |
| 11-0.3% | 1,600 | 1,410 |
| 12-0.6% | 1,680 | 1,510 |

The base polymer had poorer properties as compared to the polymer with additive. Ultimate tensile strength and elongation were surprisingly higher for the samples with additive. The mechanical properties did not appear to change significantly above the 0.1% level.

| B. XPS Data | |
|---|---|
| Sample # % F-additive | F (Atom. %) |
| 11-0.3% | 1.7 |
| 12-0.6% | 3.0 |

POLYETHER-POLYAMIDE BLOCK COPOLYMER

| A. Tensile Strength | | |
|---|---|---|
| Sample # % F-additive | UTS (psi) | Elongation (%) |
| 13-Nat. | 4,030 | 1,110 |
| 14-0.1% | 4,850 | 1,490 |
| 15-0.3% | 4,530 | 1,520 |
| 16-0.6% | 3,300 | 1,380 |

Additive levels of 0.1 and 0.3% yielded higher UTS and elongation.

MIXED SEBS BLOCK COPOLYMERS

| A. Tensile Strength | | |
|---|---|---|
| Sample # % F-additive | UTS (psi) | Elongation (%) |
| 17-0.1% | 1,370 | 1,670 |
| 18-0.6% | 1,270 | 1,549 |

EXAMPLE 3

The procedure of Example 1 was followed to prepare and test the following compositions containing 0.1% to 0.8% F-additive.
A. Polybutylene terephthalate (PBT) polyester thermoplastic. Blends were prepared with 0.1% and 0.5% additive.
B. Acrylonitrile-butadiene-styrene (ABS). thermoplastic. Blends with 0.3% and 0.8% additive were prepared.
C. Clear polystyrene. Blend with 0.3% additive.
D. Polyurethane elastomer with 0.5% additive.
E. Polycarbonate with 0.5% additive.
The results are set forth in the following tables.

POLYBUTYLENE TEREPHTHALATE

| Mechanical Testing-Tensile Strength and % Elongation | | |
|---|---|---|
| Sample # % F-additive | UTS (psi) | Elongation (%) |
| 1-Nat. | 10,270 | 274 |
| 2-0.1% | 10,110 | 203 |
| 3-0.5% | 10,330 | 274 |

| Contact Angle | |
|---|---|
| Sample # % F-additive | Contact Angle (°) |
| 1-Nat. | 57 |
| 2-0.1% | 60 |
| 3-0.5% | 71 |

The water contact angle increases (increasingly hydrophobic) as the amount of additive increases.

ABS

XPS Data

| Sample # % F-additive | F (Atom. %) |
|---|---|
| 1-Nat. | — |
| 2-0.1% | 3.5 |
| 3-0.5% | 5.3 |

Mechanical Testing-Tensile Strength and % Elongation

| Sample # % F-additive | UTS (psi) | Elongation (%) |
|---|---|---|
| 5-Nat. | 7,820 | 35 |
| 6-0.3% | 7,260 | 33 |
| 7-0.8% | 7,142 | 29 |

Contact Angle

| Sample # % F-additive | Contact Angle (°) |
|---|---|
| 1-Nat. | 73 |
| 2-0.3% | 81 |
| 3-0.8% | 96 |

POLYSTYRENE

Contact Angle

| Sample # % F-additive | Contact Angle (°) |
|---|---|
| 1-Nat. | 72 |
| 2-0.3% | 80 |

XPS Data

| Sample # % F-additive | F (%) |
|---|---|
| 10-0.3% | 10.0 |

POLYCARBONATE

Mechanical Testing-Tensile Strength and % Elongation

| Sample # % F-additive | UTS (psi) | Elongation (%) |
|---|---|---|
| 17-Nat. | 7410 | 29 |
| 18-0.5% | 7930 | 34 |

Contact Angle

| Sample # % F-additive | Contact Angle (°) |
|---|---|
| 17-Nat. | 78 |
| 18-0.5% | 97 |

XPS Data

| Sample # % F-additive | F (%) |
|---|---|
| 18-0.5% | 32.0 |

We claim:

1. A composition of matter consisting essentially of a thermoplastic polymer and a perfluorinated hydrocarbon-polyether additive formed by melt-blending said thermoplastic polymer and from about 0.01% to less than 1%, by weight, of said perfluorinated hydrocarbon-polyether additive selected from the group consisting of an oil, gum, grease and mixtures thereof, said additive having a lower surface energy than that of said polymer; said blending resulting in a substantially homogeneous admixture of said polymer and said additive; said admixture, upon cooling, resulting in a solid thermoplastic composition wherein the concentration of said additive through a cross-section of said solid thermoplastic composition is lower in the interior thereof and higher at the surfaces thereof.

2. A composition according to claim 1 wherein said additive is an oil.

3. A composition according to claim 2 wherein said fluorocarbon oil is selected from the group consisting of fluorinated hydrocarbon polyethers and fluorinated hydrocarbons.

4. A composition according to claim 3 wherein said fluorocarbon additive is a perfluorinated polyether.

5. A composition according to claim 2 wherein said additive is perfluorinated polypropylene oxide.

6. A composition according to claim 1 wherein said additive is a gum.

7. A composition according to claim 1 wherein said additive is a grease.

8. A composition of matter consisting essentially of a thermoplastic polymer and a perfluorinated hydrocarbon-polyether additive formed by melt-blending said thermoplastic polymer comprising said polyolefin or polyolefin copolymer and from about 0.01% to less than 1%, by weight, of a perfluorinated hydrocarbon-polyether additive selected from the group consisting of an oil, gum, grease and mixtures thereof, said additive having a lower surface energy than that of said polymer; said melt-blending resulting in a substantially homogeneous admixture of said polymer and said additive; said admixture, upon cooling, resulting in a solid thermoplastic composition wherein the concentration of said additive through a cross-section of said solid thermoplastic composition is lower in the interior thereof and higher at the surfaces thereof.

9. A composition according to claim 8 wherein said additive in an oil.

10. A composition according to claim 9 wherein said fluorocarbon oil is selected from the group consisting of fluorinated hydrocarbon polyethers and fluorinated hydrocarbons.

11. A composition according to claim 9 wherein said fluorocarbon additive is a perfluorinated polyether.

12. A composition according to claim 9 wherein said additive is perfluorinated polypropylene oxide.

13. A composition according to claim 8 wherein said additive is a gum.

14. A composition according to claim 8 wherein said additive is a grease.

* * * * *